W. E. HANNAFORD & C. E. PICKETT.
B. M. PICKETT, EXECUTRIX OF C. E. PICKETT, DEC'D.
MACHINE FOR CUTTING AND CHOPPING PLANTS AND VINES.
APPLICATION FILED JUNE 6, 1914.

1,200,937.

Patented Oct. 10, 1916.
2 SHEETS—SHEET 1.

WITNESSES

INVENTORS
W. E. Hannaford,
C. E. Pickett deceased
By Bertha M. Pickett, Administratrix
Attorney W. E. HANNAFORD & C. E. PICKETT.
B. M. PICKETT, EXECUTRIX OF C. E. PICKETT, DEC'D.
MACHINE FOR CUTTING AND CHOPPING PLANTS AND VINES.
APPLICATION FILED JUNE 6, 1914.
1,200,937.
Patented Oct. 10, 1916.
2 SHEETS—SHEET 2.
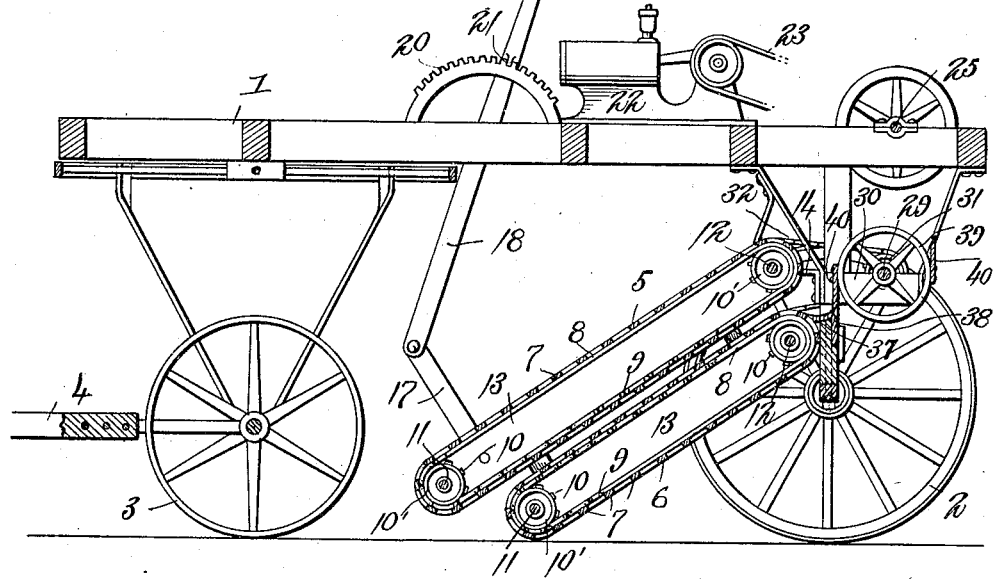
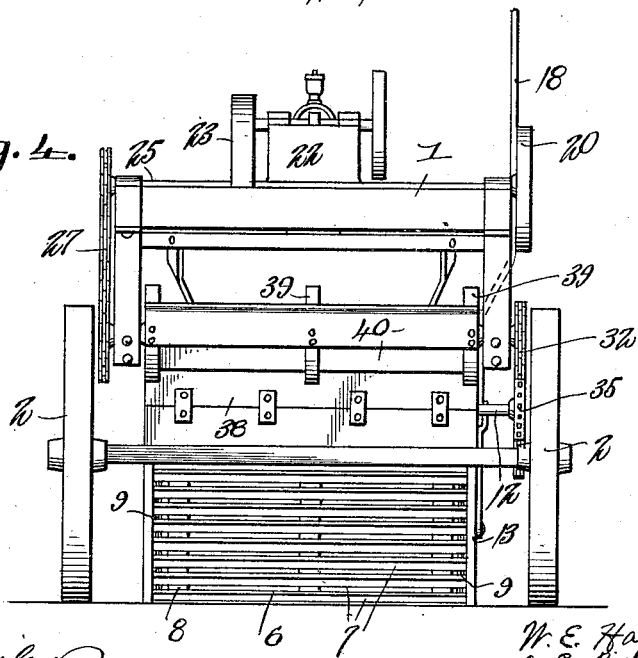

UNITED STATES PATENT OFFICE.

WILLIAM E. HANNAFORD, OF REEDLEY, AND CHARLES E. PICKETT, DECEASED, LATE OF FRESNO, CALIFORNIA, BY BERTHA M. PICKETT, EXECUTRIX, OF FRESNO, CALIFORNIA.

MACHINE FOR CUTTING AND CHOPPING PLANTS AND VINES.

1,200,937.  Specification of Letters Patent.  Patented Oct. 10, 1916.

Application filed June 6, 1914. Serial No. 843,584.

*To all whom it may concern:*

Be it known, that we, WILLIAM E. HANNAFORD, residing at Reedley, county of Fresno, in the State of California, and BERTHA M. PICKETT, of Fresno, county of Fresno and State of California, administratrix of the estate of CHARLES E. PICKETT, deceased, late a citizen of the United States, hereby set forth that said WILLIAM E. HANNAFORD and CHARLES E. PICKETT, deceased, did invent certain new and useful Improvements in Machines for Cutting and Chopping Plants and Vines, of which the following is a specification.

The invention relates to machines for cutting plants and vines, and particularly to a machine adapted to cut plants or vines into short lengths whereby the same may effectively serve as fertilizing material.

Among the objects of the invention is the provision of a machine of this kind adapted for travel and designed to grasp and elevate during travel, the plants or vines to be cut or chopped, and feed the elevated plants or vines to suitable cutting means prior to the return of the plants or vines to the ground in chopped condition.

The more specific objects and advantages of the machine will appear hereinafter from the description following taken in connection with the accompanying drawings.

In said drawings:—

Figure 1:
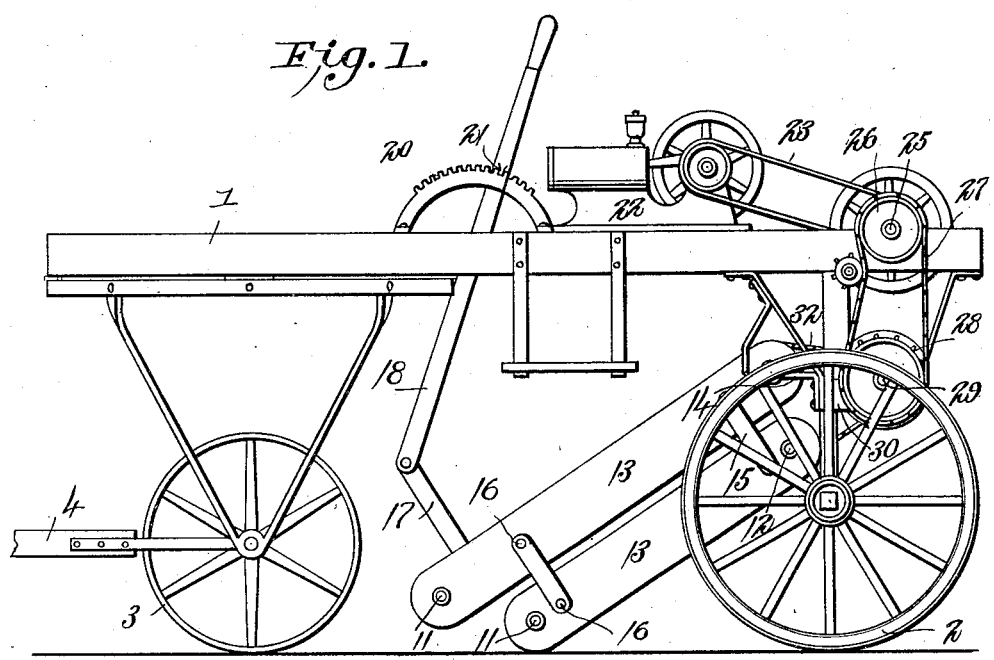
Figure 3:
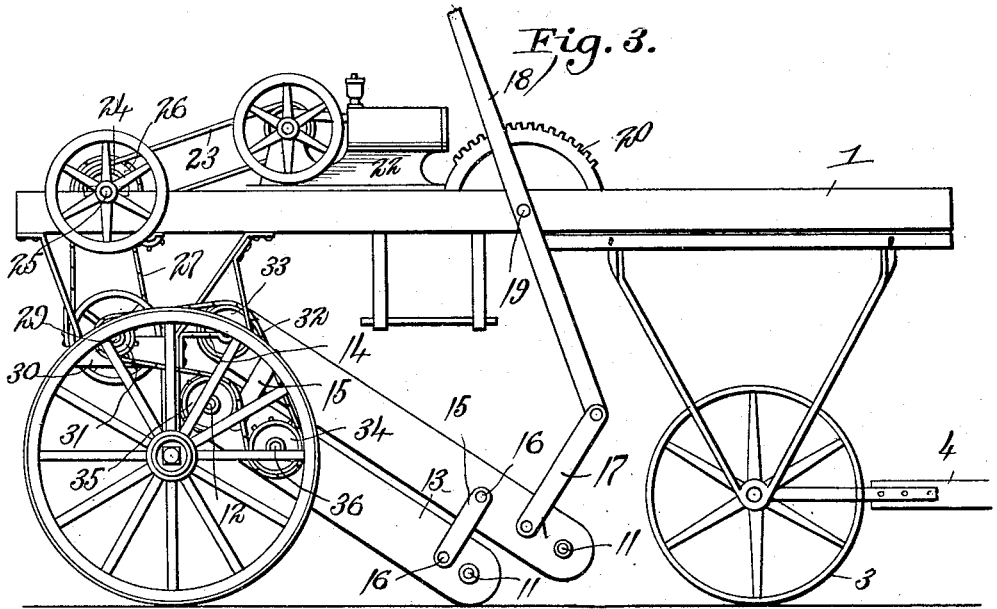

Figure 1 is a side elevation; Fig. 2 is a vertical sectional view; Fig. 3 is a side elevation taken from the side opposite to that of Fig. 1; and Fig. 4 is a rear elevation.

Throughout the views of the drawings, like reference characters designate like or similar parts.

Referring to the drawings, the truck or vehicle upon which the novel parts are mounted may be of any suitable construction, and be drawn by draft animals or be self-propelled as desired. With more specific reference to the drawings, the truck or vehicle body as shown, comprises a platform 1 built up of suitable longitudinal and transverse beams, rear wheels 2 supported in any suitable manner from the platform, and a front turnable steering wheel 3 being operatively connected to a draft tongue 4. The numerals 5 and 6 designate conveyers of any suitable construction which are designed to be rotated in opposite directions so that the adjacent portions thereof will travel in the same direction. The forward conveyer, it will be seen, is mounted a slight distance above the ground and the rear conveyer 6 extends quite close to the ground and below the conveyer 5. As shown, each conveyer comprises a plurality of spaced apart slats 7 which are connected by means of flexible straps or belts 8. Also connected to each of the conveyers is a sprocket chain 9 which is adapted to pass over sprocket wheels 10 mounted at opposite ends of the conveyer and directly on shafts 11 and 12, which in turn are journaled in suitable frames having side boards or members 13. The major portions of the conveyers pass over rollers 10' mounted on the shafts 11 and 12. The shaft 12 for the front conveyer extends beyond the boards 13 and is suitably supported in brackets 14 fastened to suitable parts of the frame of the vehicle. The frame or side boards 13 for the rear conveyer are supported from the side boards 13 of the front conveyer by means of the connecting links 15 fastened at 16 to the side boards. A bracket 17 is pivotally fastened to one of the side boards of the forward conveyer and has pivoted thereto a lever 18 in turn pivoted at 19 to the platform 1. This lever is adapted for adjustment to raise both of the conveyers above the ground whenever desired, as when not in operation and when a different adjustment as to the height of the conveyers is desired. Suitable means is provided whereby the lever 18 may be locked in adjusted positions, and as shown consists of a toothed segment 20 fastened on the platform 1, and with which is adapted to engage a suitable operating tooth or plunger 21 carried by the lever 18.

Suitable means is provided for positively driving the conveyers, preferably through the medium of a suitable engine or power unit 22 mounted upon the platform 1 and the other parts now to be described. Said engine is adapted to drive a belt 23 which passes over a pulley 24 and drives a shaft 25 suitably mounted upon platform 1. Shaft 25 has keyed thereto a sprocket wheel 26 over which passes a sprocket chain 27 in turn passing over a sprocket wheel 28 mounted on a shaft 29 suitably supported upon the frame of the vehicle as upon brackets 30. A sprocket wheel 31 is also mounted on said shaft 29 and thereover passes a sprocket chain 32, which also passes over a sprocket wheel 33, an intermediate or idler sprocket wheel 34 and a sprocket wheel 35. The sprocket wheels 33 and 35 are keyed to the shafts 12 and the intermediate sprocket wheel 34 rotates on a shaft 36 suitably mounted in one of the side boards or frames 13.

At the rear of the machine adjacent the inner ends and in the intermediate space between the conveyers 5 and 6, may be mounted a plate 37, and adjacent the same a vertically arranged cutter bar or knife 38. Upon shaft 29 are mounted a suitable number of rims 39 to which are fastened one or more cutter bars or knives 40, in combination with the rims forming a cutter member or cutting device. It will be noted that the cutter bars 40 are arranged to come into close contact with the cutter or bar 38 upon rotation of the shaft 29.

When the device is not in operation, the conveyers 5 and 6 and like parts, are preferably raised or elevated above the ground through the proper adjustment of lever 18, the frames of said conveyers swinging or pivoting from the shaft 12 of the forward conveyer. Preparatory to use, the conveyers 5 and 6 are adjusted through the operation of lever 18 to the proper height. Thereupon the device is drawn along or propelled and vines or plants which may be in the path of travel are gripped or grasped by the bars 7 of the conveyer, in the space intermediate or between the conveyers, said plants or vines not being engaged by the bars 7 until the same have passed the forward portion thereof and moved into engagement therewith through the turning or travel of conveyer 6, due to the fact that the forward end of the conveyer 5 and allied parts are mounted above the conveyer 6. As stated, the conveyers 5 and 6 at the space intermediate the same, or space in which the gripped vines or plants travel, travel in the same direction and feed the plants or vines onto plate 37 and thence over the knife or cutter bar 38, whereupon the vines are engaged by either of the knives 40, and the portions thereof projecting above the bar 38 severed from the remainder. It will thus be realized that the vines are cut or chopped into short lengths and continuously supplied between the cutters 38 and 40. The parts of course are built according to the length it is desired to cut the vines, and as preferred by us at the present time, the preferred type of machine will cut the vines or plants into lengths varying from one to four inches. After being cut, it is clear that the vines in chopped condition return to the ground, remaining there and serving as fertilizing material.

The machine of the present invention is very desirable in vineyards, in that the pruned or cut portions of vines may be thrown into the path intermediate the same and our machine then caused to travel the length of the path and elevate, cut and return the vines in chopped condition to the soil or ground.

Various changes in the details of construction may be resorted to, without departing from the spirit and scope of our invention, and hence are reserved providing they fall within the spirit and scope of the appended claims.

Having thus described our said invention, what we claim as new and desire to secure by Letters Patent is:—

In a machine of the class described, a supporting structure, cutter means, conveyer means leading to said cutter means, said conveyer means comprising adjacently arranged conveyers, shafts supporting said conveyers, means connecting the respective shafts of each of the conveyers, means rigidly connecting said last mentioned means, spaced apart brackets positioned on said supporting structure, one of the shafts on the uppermost conveyer, having its end portions extended and seated in said brackets, means to raise and lower said conveyers, said last mentioned shaft serving as a fulcrum for said conveyers, sprocket wheels keyed to certain of said conveyer shafts, an idler sprocket wheel carried by said first mentioned connecting means, a sprocket trained about said sprocket wheels and means to drive said sprocket.

In testimony whereof I affix my signature in the presence of two witnesses.

WILLIAM E. HANNAFORD.

Witnesses:
MARION DENEEN,
L. H. RASMUSSEN.

In testimony whereof I affix my signature in the presence of two witnesses.

BERTHA M. PICKETT,
*Administratrix of the estate of Charles E. Pickett, deceased.*

Witnesses:
LUCIAN L. GARRETT,
A. E. COCHRANE.